Aug. 9, 1938.  H. STUKART  2,126,421
SLICING MACHINE
Filed March 16, 1936  2 Sheets-Sheet 2
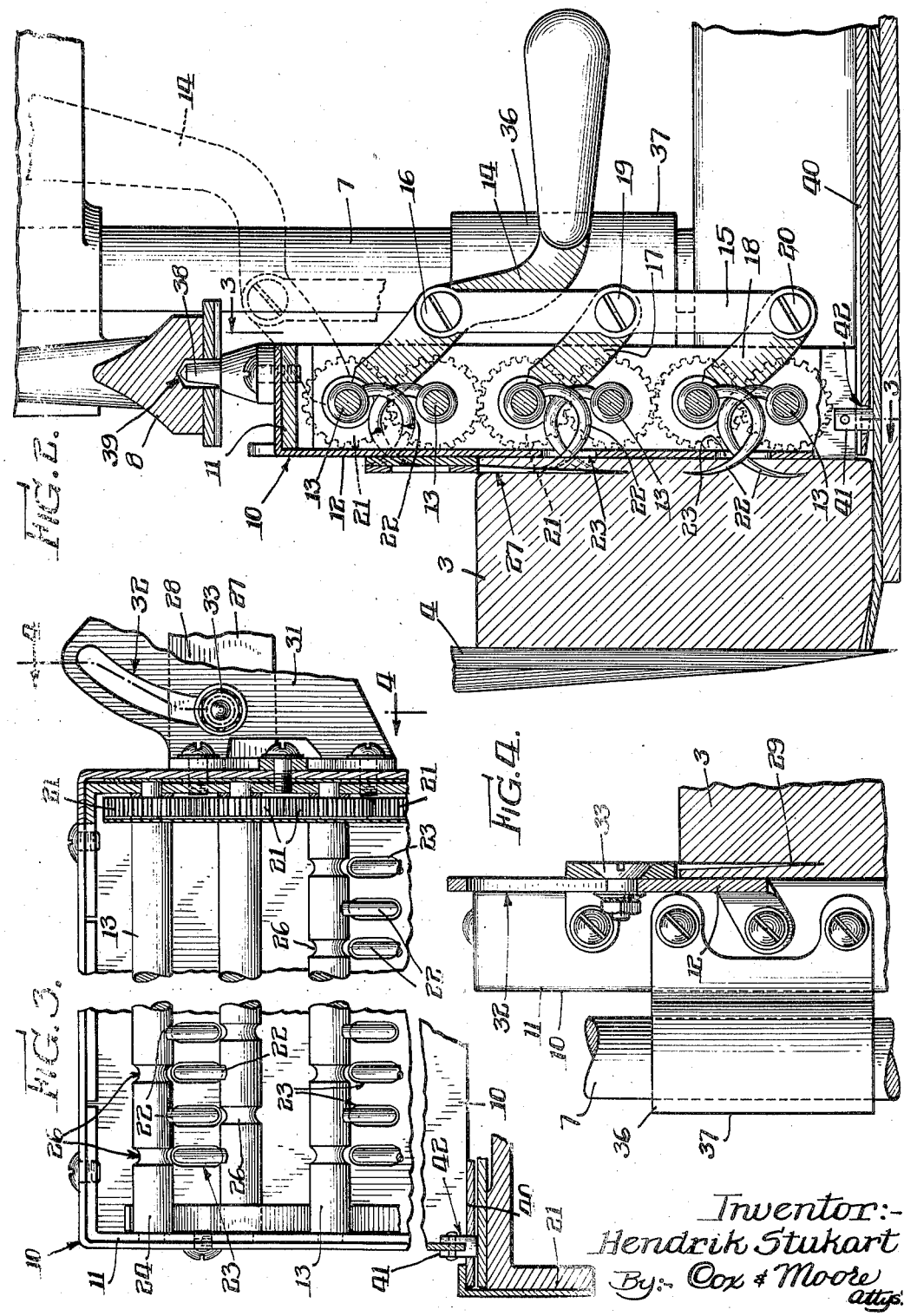
Inventor:-
Hendrik Stukart
By:- Cox & Moore
attys.

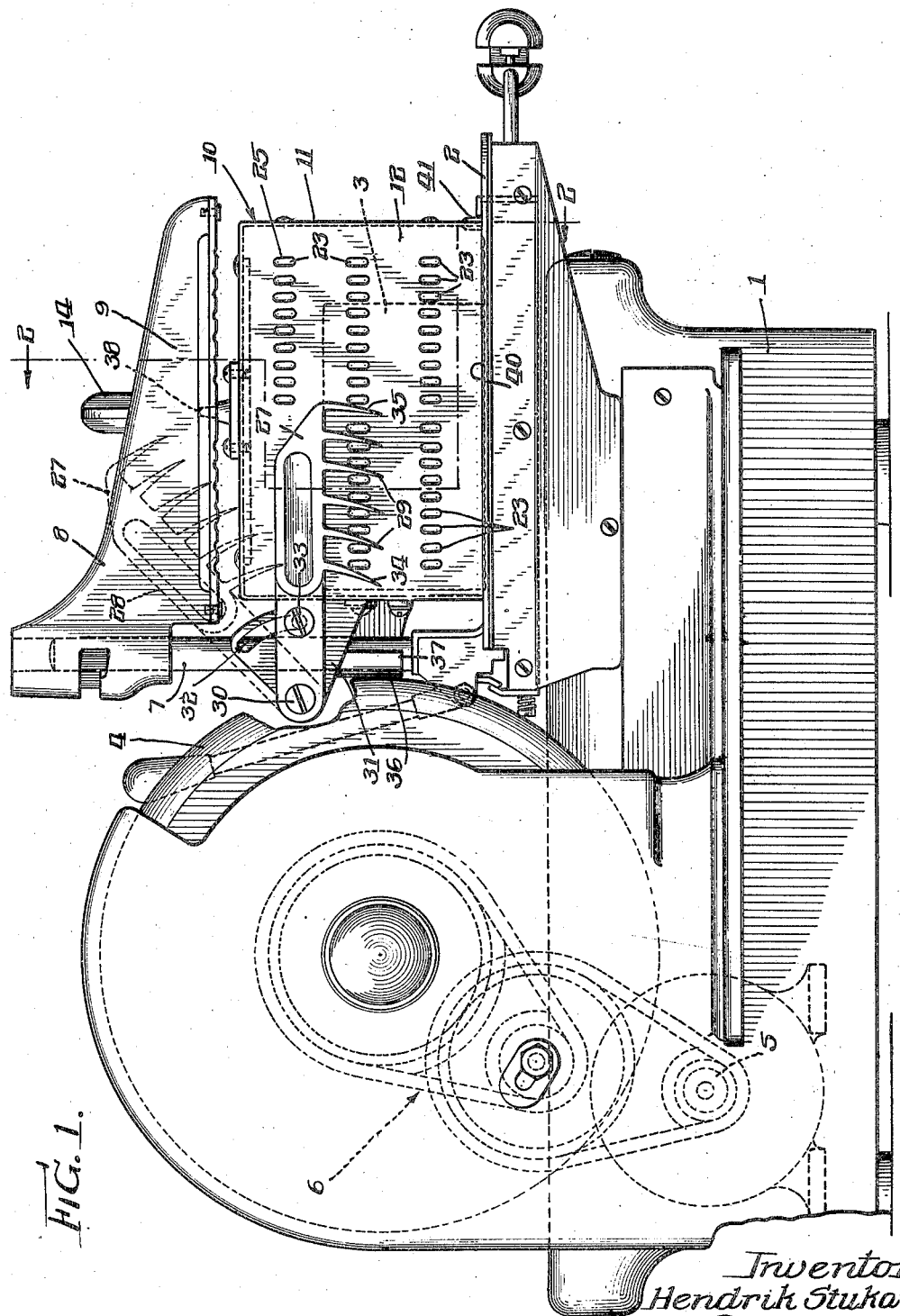

Patented Aug. 9, 1938

2,126,421

UNITED STATES PATENT OFFICE 2,126,421

SLICING MACHINE

Hendrik Stukart, La Porte, Ind., assignor to U. S. Slicing Machine Company, La Porte, Ind., a corporation of Indiana Application March 16, 1936, Serial No. 69,043

3 Claims. (Cl. 146—216)

This invention relates to slicing machines, and more particularly to means for supporting a substance on the slicing machine food table during the cutting operation. More specifically the invention relates to a gripping element for gripping and supporting the relatively short pieces of substance such as the end pieces of meat and relatively small end pieces of cheese.

An important object of the invention is the provision of a gripper element for gripping the end pieces of substance which are so short that they cannot be fed by the usual food clamping device.

Another object of the invention is the provision of a meat gripper, which is provided with movable tines which are adapted to grip into a substance when the substance is pressed thereagainst, whereby relatively short pieces or end pieces of substance can be held and supported in proper position, so that the short or end pieces can be sliced, making it possible for the complete slicing of an entire piece of substance.

A further object of the invention is the provision of an individual meat grip for gripping relatively short pieces of substance, and which is provided with a movable element having teeth or prongs for digging into the upper surface of a piece of substance, such as a piece of cheese, to support the substance during the cutting operation, the pronged element being so constructed and arranged that the prongs will not interfere with the tines which extend from the face of the element.

Numerous other objects and advantages will be apparent throughout the progress of the following specifications.

The accompanying drawings illustrate a selected embodiment of the invention and the views therein are as follows:

Fig. 1 is a detail elevational view looking from the left-hand side of the machine toward the right.

Fig. 2 is a detail vertical sectional view on the line 2—2 of Fig. 1.

Fig. 3 is a detail rear elevation of the improved gripper, and embodying the invention, certain parts being broken away for the sake of clearness, said view being taken on the line 3—3 of Fig. 2.

Fig. 4 is a detail sectional view on the line 4—4 of Fig. 3.

The particular slicing machine herein shown for the purpose of illustration comprises a base 1 upon which there is mounted for fore and aft reciprocation a carriage 2. Substance 3 is mounted on the carriage 2 and is adapted to have slices cut therefrom by a rotary slicing knife 4. The knife 4 is adapted to be driven from the motor shaft 5 through the medium of pulleys and belts indicated generally by the numeral 6. A vertical supporting element or standard 7 is operatively supported by the carriage 2 and is adapted to carry a food or substance clamp 8. The clamp 8 is adapted to clamp the substance as it is fed to the cutting plane of the machine. This clamp 8 may also be used if and when desired as a pusher, the face 9 acting as a pusher plate or surface.

The gripper 10 which comprises the main subject matter of the present invention comprises a frame 11 to which there is rigidly connected a flush front face 12. A plurality of longitudinal shafts or rods 13 are mounted in suitable bearings in the frame 10 and are adapted to have rotary movement with respect to the bearings. A handle operating element 14 is rigidly fixed to one of the rods or shafts 13 and has a link 15 pivotally connected thereto, as indicated at 16, Fig. 2. Rigid arms 17 and 18 are fixed to alternate rods or shafts 13 and these arms are pivotally connected to the link 15 as indicated at 19 and 20, respectively, Fig. 2.

Each rod or shaft 13 is provided with a gear 21 which intermeshes so that when the handle operating element 14 is operated each shaft 13 will rotate. In other words operation of the handle element 14 will cause rotation of alternate shafts 13 because of the connection of the link 15 with the parts 14, 17 and 18. Operation of the parts 14, 17 and 18 causes rotation of three of the shafts or rods 13, and because of the intermeshing gears 21, the remaining three rods or shafts 13 will also be rotated.

Each shaft 13 is provided with a plurality of spaced, hook-shaped tines 22 which are adapted to extend through slots or openings 23 provided in the front face 12 of the gripper element 10. The rods or shafts 13 are so constructed and arranged as to operate in pairs, i. e., the upper pair of shafts 13 operate as a unit together, as do the two central shafts 13, and the two lower shafts 13, and due to the gearing connection the adjacent shafts of each pair will rotate in opposite directions. For example the upper pair of shafts 13, which are indicated by the numeral 24, Fig. 3, each carry tines 22 which operate through the upper row 25 of the openings 23, Fig. 1. In other words, there are six shafts, each carrying tines. The tines on an upper shaft extend downwardly, while the tines on the next adjacent shaft extend upwardly, so that the tines on two shafts operate through a single row of holes or openings 23. Adjacent shafts rotate in opposite directions so that upon operation of the handle element 14 the tines from two shafts will pass through a single row of openings 23. The tines on the shafts of each pair are alternately spaced horizontally so that the tines on adjacent shafts pass through alternate openings.

Each shaft is provided with a reduced diameter or grooved portion 26 to accommodate the tine on the adjacent shaft, Fig. 3. Therefore, when the handle operating element 14 is moved down in the position as indicated in Fig. 2 in full lines, the cooperating tines on adjacent shafts will assume the position shown in Fig. 2, whereby the tines on an upper shaft will extend upwardly through alternate openings 23, while the tines on the lower adjacent shaft will extend downwardly through the alternate openings 23 in its respective row.

When the handle operating element 14 is moved to non-operative position as shown in dotted lines in Fig. 2, the tines will move out of the holes or openings 23 and their ends will be positioned behind the face plate 12. To operatively hold and support a piece of substance, the substance is pressed against the flush face 12 and the handle 14 is moved downwardly from the position shown in dotted lines in Fig. 2 to the position shown in full lines in that figure. This movement of the element 14 will cause the tines 22 to extend through the openings 23 and dig into the substance, holding it securely and tightly against the flush face 12 of the gripper element 10.

Each tine 22 is thicker at its base and tapers to a relatively sharp point. Each tine is also curved and its operation is arcuate so that it will freely pass into the substance, leaving a clean hole and in no way tearing the substance.

For relatively soft substances, such as cooked meats, and particularly cheese, the tines may tend to tear or pull out of the substance during the cutting operation because of the friction between the substance and the cutting knife during the cutting operation. To securely hold soft substances such as cheese and prevent the tines from pulling out or tearing the substance, an additional holder element 27 is provided.

The holder element 27 comprises a body 28 provided with downwardly extending arcuate teeth 29. The end of the body 28 is pivotally mounted at 30 to a bracket 31 which is fastened to one side of the frame 11, Fig. 1. The back side of the holder element 27 is guided vertically along the front face of the bracket 31 and the face 12 of the member 10. This bracket is provided with an arcuate slot 32 into which a pin or stud 33 on the body 28 operates. This slot and pin connection 32, 33 braces the element 27 and acts as a stop to limit the pivotal movement of the member 27 as well as acting as a guide.

The teeth 29 are constructed so that when the element 27 is arranged in holding or gripping position, as shown in Fig. 1, the teeth 29 will not obstruct any of the openings 23 and therefore the teeth 29 will not become engaged with or foul the tines 22. The element 27 is adapted to engage the substance 3 by having its teeth 29 pressed into the substance, as clearly shown in Fig. 2, and inasmuch as the teeth 29 are arcuately curved, as clearly shown in Fig. 1, the substance will not be torn when the teeth are pressed into the substance. Each tooth 29 is drawn on a different radius. Therefore the first tooth 34, Fig. 1, has a smaller radius than the tooth 35, because the pivot 30 is used as a center. The teeth 29 are spaced approximately the same distance apart and this distance is substantially equal to the distance of a pair of openings 23, Fig. 1.

To permit operation of the element 27, tines on the inner ends of the upper pair of shafts are dispensed with because the body portion 28 of the element 27 would come in contact with and foul the tines 22. Therefore the uppermost row of holes 25, Fig. 1, extends only half-way across the face 12. The element 27 is part of the gripping element 10, being made an integral part thereof, and has operative engagement therewith, although it is free to be removed.

A supporting member 36 is connected to the gripper element 10 and has a hook-shaped end 37 which is adapted to extend around the clamp support 7 to assist in supporting and positioning the element 10. A plug or pin 38, Figs. 1 and 2, is fastened to the upper surface of the gripper element 10 and is adapted to be received in and cooperate with a recess or socket 39 formed in the under surface of the clamp 8. This element also assists in positioning and supporting the gripper element 10.

The gripper element 10 is removable and is preferably used only when relatively short pieces of substance are to be sliced. To mount the gripper 10 in operative position, the hook-shaped end 37 of the member 36 is positioned so as to receive the vertical support 7. The clamp 8 is then lowered so that the pin 38 will be received into the socket 39 in the clamp.

In cases where a separate food table 40 is used, a finger or plug 41 may be provided on the gripper element 10 and is adapted to extend down into an opening 42 provided in the food table 40, Fig. 3.

The removable food gripper 10 and its cooperating gripper element 27 may be applied to any type of slicing machine, but it is herein shown as being applied to a slicing machine embodying the feed-screw feed principle as described and claimed in a co-pending application, Serial No. 64,145, filed February 15, 1936, and assigned to the present assignee.

The invention provides a unique device for supporting short end pieces of material to permit the same to be completely sliced without causing the substance to shift or move. Therefore, the invention provides a device which assures all slices to have a uniform thickness. The device can be easily and readily applied to the slicing machine and it can be quickly and easily operated and manipulated to lock and support the small or end pieces of substance.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. A slicing machine comprising a gripper adapted to be detachably connected to a part of the machine, a face plate for the gripper and having spaced openings therein, gripper prongs movable into and out of the openings, a vertically movable member pivoted on the gripper in a plane parallel to the plane of the face plate and having spaced arcuate substance engaging teeth of varying radii which lie between spaced openings when moved to substance engaging position so as not to contact with or foul the prongs, said teeth being arranged in said parallel plane, said member having a slot therein, and a member fastened to the gripper and engaging the slot to guide the movement of the said first named member and limit the movement thereof.

2. A slicing machine comprising a gripper adapted to be detachably connected to a part of the machine, a face plate for the gripper and having spaced openings therein, gripper prongs movable into and out of the openings, and a vertically movable member pivoted on the gripper for movement in a plane parallel to the plane of the face plate and having spaced arcuate substance engaging teeth extending in said parallel plane and being of varying radii so as not to contact with or foul the prongs, and means for guiding said vertically movable member.

3. A slicing machine comprising a gripper adapted to be detachably connected to a part of the machine, a face plate for the gripper and having spaced openings therein, gripper prongs movable into and out of the openings, a vertically movable member pivoted on the gripper in a plane parallel to the plane of the face plate and having spaced arcuate substance engaging teeth of varying radii which lie between spaced openings when moved to substance engaging position so as not to contact with or foul the prongs, said teeth being arranged in said parallel plane, and a pin and slot connection between the gripper and said vertically movable member to guide the movement of said member and limit the movement thereof.

HENDRIK STUKART.